US008615637B2

(12) United States Patent
Rogers et al.

(10) Patent No.: US 8,615,637 B2
(45) Date of Patent: Dec. 24, 2013

(54) SYSTEMS AND METHODS FOR PROCESSING MEMORY REQUESTS IN A MULTI-PROCESSOR SYSTEM USING A PROBE ENGINE

(75) Inventors: Philip J. Rogers, Pepperell, MA (US); Warren Fritz Kruger, Sunnyvale, CA (US); Mark Hummel, Franklin, MA (US); Eric Demers, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 301 days.

(21) Appl. No.: 12/878,223

(22) Filed: Sep. 9, 2010

(65) Prior Publication Data

US 2011/0060879 A1 Mar. 10, 2011

Related U.S. Application Data

(60) Provisional application No. 61/241,203, filed on Sep. 10, 2009.

(51) Int. Cl.
*G06F 12/08* (2006.01)
*G06F 13/368* (2006.01)

(52) U.S. Cl.
USPC ..... 711/141; 711/146; 711/206; 711/E12.023

(58) Field of Classification Search
USPC ................... 711/141, 146, 153, 206, E12.023
See application file for complete search history.

(56) References Cited

U.S. PATENT DOCUMENTS

| | | | |
|---|---|---|---|
| 4,991,081 A * | 2/1991 | Bosshart | 711/3 |
| 5,586,297 A * | 12/1996 | Bryg et al. | 711/143 |
| 6,094,686 A * | 7/2000 | Sharma | 709/240 |
| 6,973,543 B1 * | 12/2005 | Hughes | 711/141 |
| 2003/0126365 A1 * | 7/2003 | Jamil et al. | 711/120 |
| 2003/0196047 A1 * | 10/2003 | Kessler et al. | 711/147 |
| 2004/0034756 A1 * | 2/2004 | Clark et al. | 711/202 |
| 2004/0117559 A1 * | 6/2004 | Glasco et al. | 711/141 |
| 2005/0177688 A1 * | 8/2005 | Gaither et al. | 711/145 |
| 2006/0080508 A1 | 4/2006 | Hoover et al. | |
| 2006/0080512 A1 * | 4/2006 | Hoover et al. | 711/141 |
| 2006/0080513 A1 | 4/2006 | Beukema et al. | |
| 2007/0055826 A1 * | 3/2007 | Morton et al. | 711/141 |
| 2007/0143546 A1 * | 6/2007 | Narad | 711/130 |
| 2007/0180197 A1 * | 8/2007 | Wright et al. | 711/141 |
| 2007/0242085 A1 | 10/2007 | Weybrew et al. | |
| 2008/0215820 A1 * | 9/2008 | Conway | 711/141 |
| 2009/0106498 A1 * | 4/2009 | Lepak et al. | 711/137 |
| 2009/0248983 A1 * | 10/2009 | Offen et al. | 711/122 |

FOREIGN PATENT DOCUMENTS

WO WO 2006/055477 5/2006

OTHER PUBLICATIONS

Notification of Transmittal of the International Search Report and Written Opinion for International Application No. PCT/US2010/048428, mailed Jan. 27, 2011 (12 pages).

(Continued)

*Primary Examiner* — Hal Schnee
(74) *Attorney, Agent, or Firm* — Sterne, Kessler, Goldstein & Fox P.L.L.C.

(57) ABSTRACT

A processing system is provided. The processing system includes a first processing unit coupled to a first memory and a second processing unit coupled to a second memory. The second memory comprises a coherent memory and a private memory that is private to the second processing unit.

14 Claims, 8 Drawing Sheets

(56) References Cited

OTHER PUBLICATIONS

NVIDIA: "Introduction to GPU Computing with OpenCL", nvidia, Aug. 4, 2009, XP002616515, Retrieved from the Internet: URL:http://developer.download.nvidia.com/CUDA/training/ NVIDIA__GPU__Computing__Webinars__Introduction__To__ OpenCL.pdf [retrieved on Jan. 11, 2011] pp. 10, 13.
International Preliminary Report on Patentability and Written Opinion of the International Searching Authority dated Mar. 13, 2012, issued in related PCT Application No. PCT/US2010/048428.

* cited by examiner

SYSTEMS AND METHODS FOR PROCESSING MEMORY REQUESTS IN A MULTI-PROCESSOR SYSTEM USING A PROBE ENGINE

CROSS REFERENCE TO RELATED APPLICATIONS

This application claims the benefit of U.S. Provisional Appl. No. 61/241,203, filed Sep. 10, 2009, which is incorporated by reference herein in its entirety.

BACKGROUND OF THE INVENTION

1. Field of the Invention

The present invention relates to processing environments, and more particularly to processing memory requests in multi-processor systems.

2. Background

Some graphics processing systems include multiple processing units, e.g., a central processing unit (CPU) that assigns some graphics processing tasks to one or more graphics processing units (CPUs). For example, the CPU can assign rendering tasks to one or more GPUs.

In some systems, the CPU and each of the GPUs each have their own associated memory. For example, in a system having a CPU and a GPU, the CPU can be coupled to a system memory and the GPU can be coupled to a local memory. The system memory can include a coherent memory. However, in many systems, accesses to the GPU local memory are not coherent. When coherency is required, then, software may have to be used to ensure coherency, creating a performance overhead.

What is needed, then, are methods and systems that allow for coherent accesses of the CPU's local memory without using software to ensure coherency.

BRIEF SUMMARY

Embodiments described herein generally relate to providing a memory that includes a coherent memory in multi-processor systems. For example, embodiments of the present invention can relate to providing a coherent memory in a memory coupled to a graphics processing unit (GPU).

In one embodiment, a processing system is provided. The processing system includes a first processing unit coupled to a first memory and a second processing unit coupled to a second memory. The second memory comprises a coherent memory and a private memory that is private to the second processing unit.

In another embodiment, a method of processing a memory request includes determining where a memory word associated with the memory request is located and responsive to the memory word being located in a memory, accessing the memory to process the request. The memory includes a coherent memory and a private memory private to the first processing unit.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 1:
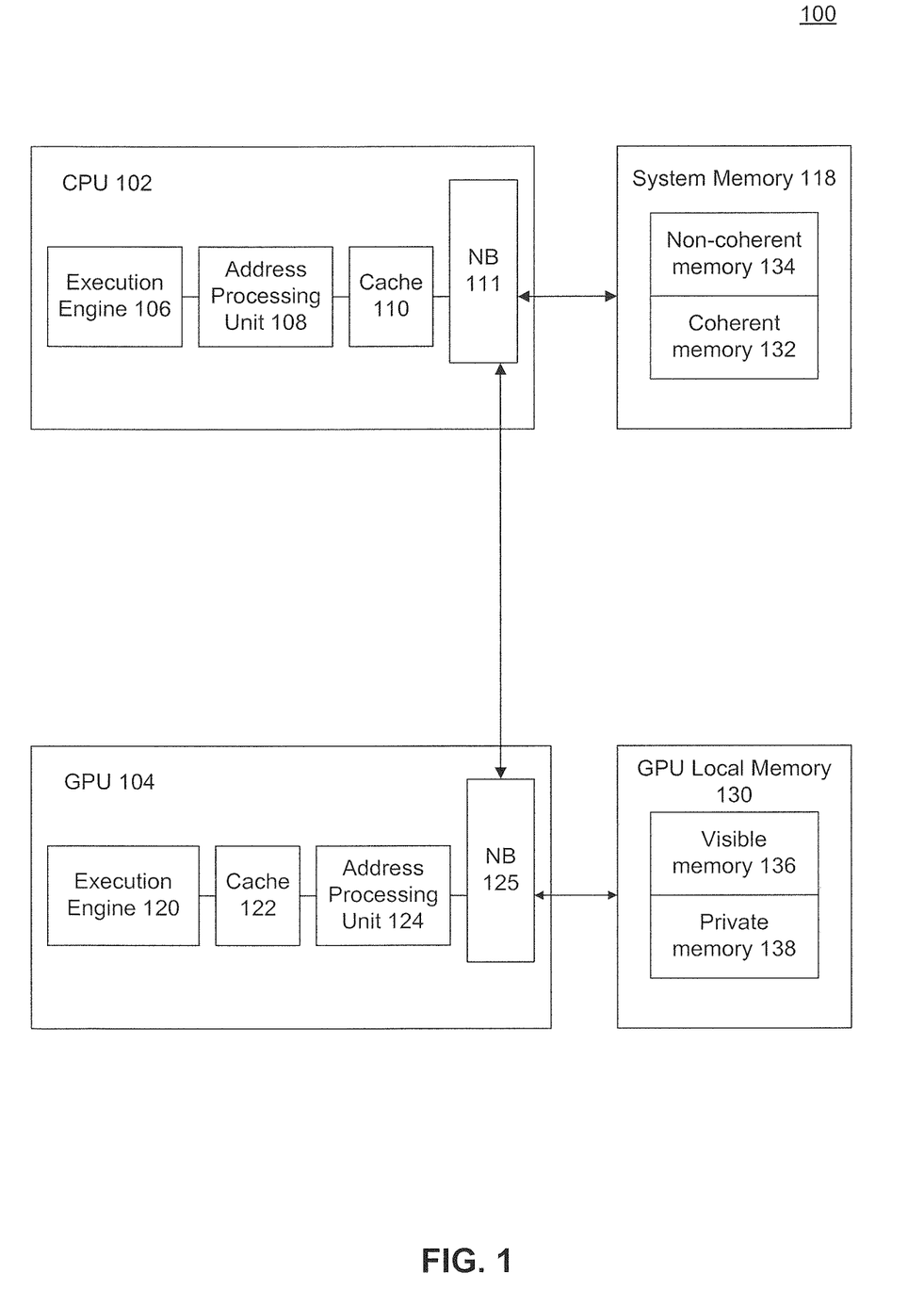
FIGS. 1-3 are illustrations of processing systems, according to embodiments of the present invention.

FIG. 1 shows the conventional processing system 100. Processing system 100 includes a central processing unit (CPU) 102, a graphics processing unit (GPU) 104, a system memory 118, and a GPU local memory 130. CPU 102 includes an execution engine 106, an address processing unit 108, a cache 110, and a northbridge (NB) 111. GPU 104 includes an execution engine 120, a cache 122, an address processing unit 124, and a northbridge 125. System memory 118 includes a coherent memory 132 and a non-coherent memory 134. GPU local memory 130 includes a visible memory 136 and a private memory 138. As would be appreciated by those skilled in the relevant arts, processing system 100 is not limited to the components shown in FIG. 1 and can include more components than those shown in FIG. 1.

Execution engine 106 executes a variety of commands during the operation of CPU 102. Some of these commands require execution engine 106 to issue memory request to access stored information. When execution engine 106 issues a memory request for a memory word, address processing 108 initially translates the virtual address corresponding to the memory request to a physical address. Address processing unit 108 also inspects the virtual address and/or the physical address to determine where the requested memory word is located. If the requested memory word is located in coherent memory 132, cache 110 is queried to determine if it can service the memory request. For example, cache 110 can be queried to determine whether it is holding the requested memory word, and if so, whether the cache line that is holding the requested memory word is valid. If cache 110 cannot service the memory request, i.e., on a cache miss, the memory request must be serviced by coherent memory 132. Specifically, NB 111 accesses coherent memory 132 to service the request. In an embodiment, NB 111 can act as a multiplexer between CPU 102 and other elements of system 100. In some embodiments, NB 111 can be termed a "memory controller." If address processing unit 108 determines that the requested memory word is located in non-coherent memory 134, NB 111 accesses non-coherent memory 134 to service the request (without first accessing cache 110).

The requested memory word may also be located in GPU local memory 130. For example, the requested memory word can be located in visible memory 136. In an embodiment, a request from CPU 102 to visible memory 136 can be a memory mapped I/O (MMIO) request. In that case, NB 111 communicates the request to NB 125 (e.g., over a peripheral component interconnect express (PCIS) path). In an embodiment, NB 125 is substantially similar to NB 111. NB 125 access visible memory 136 to obtain the requested memory word and communicates the memory word back to NB 111.

GPU private memory 138 is private to GPU 104 (i.e., inaccessible to CPU 102). Thus, if the requested memory is located in memory 138, address processing unit 108 will generate a fault to prevent CPU 102 from accessing private memory 138.

Similar to CPU 102, execution engine 120 of GPU 104 executes a variety of commands during the operation of GPU 104. In response to one or more of these commands, execution engine 120 can generate a memory request. The issued memory request includes a virtual requested memory address. As shown in FIG. 1, GPU 104 first queries cache 122 to determine if it is holding the requested memory word (using the virtual memory address). If cache 122 is not holding the memory request or otherwise can not service the memory request, the memory word must be retrieved from memory.

Address processing unit 124 translates the virtual address to a physical address and determines where the requested memory word is located. For example, if address processing unit 124 determines that the requested memory word is located in visible memory 136 or private memory 138 of GPU local memory 130, NB 125 interacts with GPU local memory 130 to service the request.

If the requested memory word is located in system memory 118, NB 125 sends a request to CPU 102 to obtain the requested memory word. For example, if the requested memory word is located in coherent memory 132, NB 111 can access coherent memory 132 to service the request. In another embodiment, NB 111 can access cache 110 to service such a request. If the requested memory word is located in non-coherent memory 132, NB 111 can access non-coherent memory 134 to service the request.

All accesses to GPU local memory 130 are non-coherent. If coherency is required, it must then be provided by software, which results in considerable overhead. Furthermore, cache 122, which caches information stored in GPU local memory 130, is a non-coherent cache. In contrast to cache 110 of CPU 102, which incorporates a protocol, such as the MESI protocol, to allow for coherent sharing with other devices, cache 122 of GPU 104 does implement a protocol to allow for sharing among different devices.

In an embodiment, a write combining module can be provided in each of CPU 102 and GPU 104. In doing so, multiple write requests can be combined so that the bandwidth for write requests to non-coherent memory can be similar to the bandwidth for write requests to coherent memory. However, similar caching optimizations for read requests are often not available. Thus, read requests to non-coherent memory (e.g., from CPU 102 to visible memory 136) can be at substantially smaller bandwidth than read requests to coherent memory. In some embodiments, read requests to non-coherent memory can be designated "non-performant" and rarely, if ever, used. Indeed, in an embodiment, read requests from CPU 102 to visible memory 136 can be at such a low bandwidth that address processing unit 108 can generate a fault, thus preventing CPU 102 from reading from visible memory 136.

In embodiments described herein, a coherent memory is provided in a GPU local memory. Thus, some requests to the GPU local memory can be hardware coherent, i.e., coherency is ensured by the hardware without requiring software overhead. In a further embodiment, the coherent memory of the CPU (e.g., included in system memory) and the coherent memory included in the GPU local memory can be essentially indistinguishable for a programmer writing code for the system. This simplified memory model can make programming much simpler because programs that access coherent memory no longer have specify which coherent memory is to be accessed. Furthermore, systems described herein may also have performance advantages because software overhead is no longer relied on to ensure coherence and read requests can be conducted at substantially higher bandwidth when they access coherent memory than when they access non-coherent memory.

Figure 2:
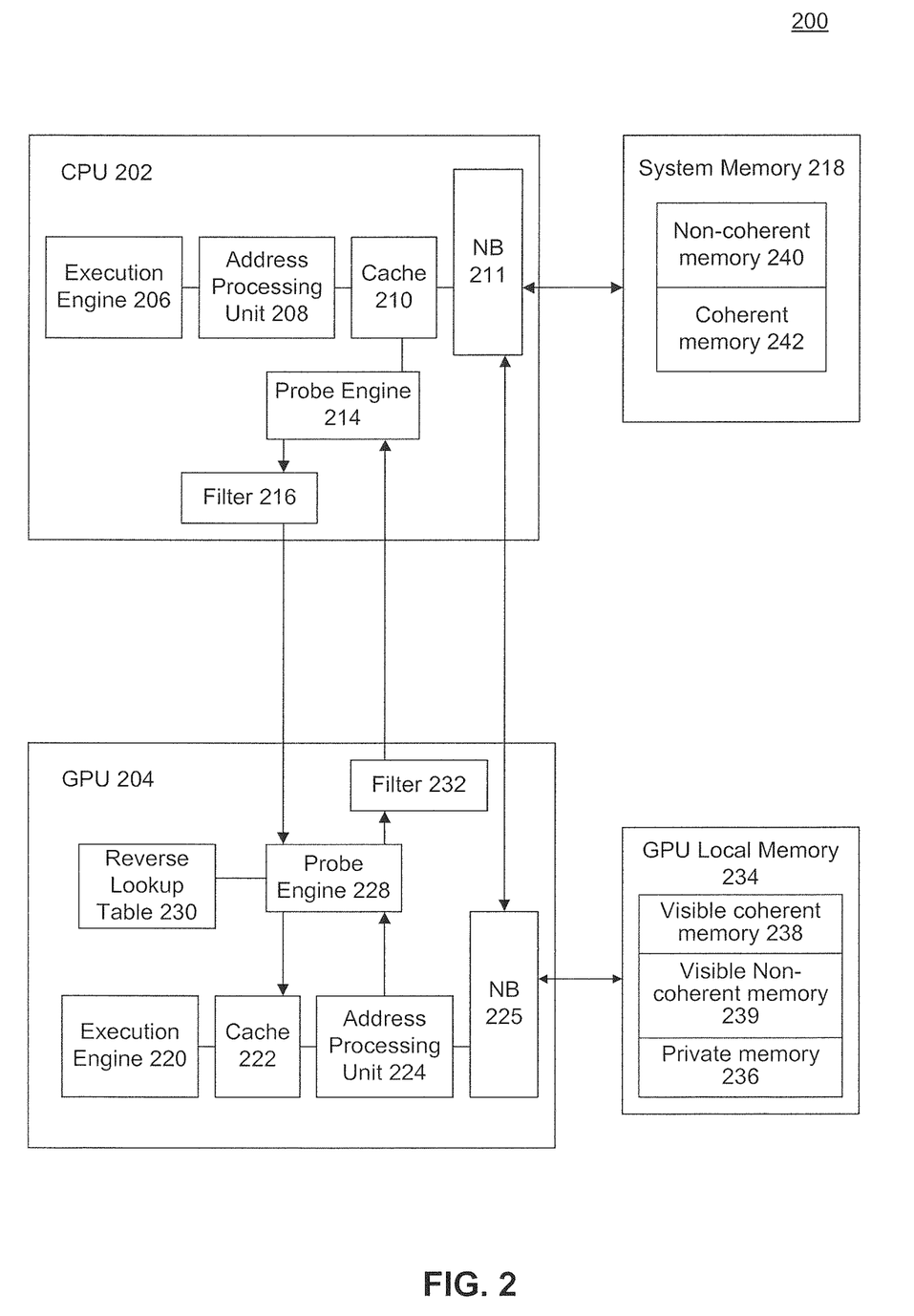

FIG. 2 shows a processing system 200, according to an embodiment of the present invention. As shown in FIG. 2, the processing system 200 includes a first processor 202, a second processor 204, a system memory 218, and a memory 234. In the embodiment shown in FIG. 2, first and second processors 202 and 204 are a CPU and a GPU, respectively.

CPU 202 includes an execution engine 206, an address processing unit 208, a cache 210, a NB 211, a probe engine 214, and a probe filter 216. In an embodiment, execution engine 206, address processing unit 208, cache 210, and NB 211 are substantially similar to execution engine 106, address processing unit 108, cache 110, and NB 111, respectively, of CPU 102 shown in FIG. 1.

As shown in FIG. 2, GPU 204 includes an execution engine 220, a cache 222, a an address processing unit 224, a probe engine 228, a reverse look up table 230, and a probe filter 232. In an embodiment, execution engine 220, cache 222, address processing unit 224, and NB 225 are substantially similar to execution engine 120, cache 122, address processing unit 124, and NB 125, respectively, of GPU 104 shown in FIG. 1.

System memory 218 includes a non-coherent memory 240 and a coherent memory 242. GPU local memory includes a visible coherent memory 238, a visible non-coherent memory 239, and a private memory 236. As described above, performance for write requests to non-coherent memory can be improved through the use write combining. Thus, in embodiments, each of non-coherent memory 240 and visible non-coherent memory 238 can be termed a "write-combining memory" or a "write-combining heap." System memory 218 and memory 234 can be formed out of conventional random access memories (RAM). For example, system memory 218 can be formed out of a DDR2 or DDR3 RAM memory and memory 234 can be formed out of a DDR5 RAM memory.

Address processing units 208 and 225 are processing units that are configured to translate virtual addresses to physical addresses. Furthermore, address processing units can also be configured to determine where physical addresses are located (e.g., among system memory 218 and GPU local memory 234). In an embodiment, address processing unit 208 and/or address processing unit 225 can include a translation lookaside buffer (TLB) that is used to translate virtual addresses into physical addresses.

In an embodiment, the operation of CPU 202 with respect to memory requests requesting a memory word located in non-coherent memory 240, visible non-coherent memory 239, and private memory 236 is substantially similar to the operation of CPU 102 with respect to a memory request requesting a memory word located in non-coherent memory 134, visible memory 136, and private memory 138, respectively. Furthermore, the operation of GPU 204 with respect to memory requests requesting a memory word located in private memory 236, visible non-coherent memory 239, and non-coherent memory 240 is substantially similar to the operation of GPU 104 with respect to a memory request requesting a memory word located in private memory 138, visible memory 136, and non-coherent memory 134, respectively.

CPU 202 includes probe engine 214 and probe filter 216. Probe engine 214 is used to ensure coherence between cache 210 and coherent memory 242 and cache 222 and visible coherent memory 238. For example, if the requested memory word is located in coherent memory 240 of system memory 218, probe engine 214 generates probes that are sent to GPU 204. The probes are used to determine if cache 222 of GPU 204, is holding the requested memory word in a dirty cache line, i.e., in cache line holding a value that has been modified relative to the value in coherent memory 242. If cache 222 includes such a dirty cache line, GPU 204 will send the cached value back to system memory 218 in response to the probe. Additionally, if the request is a write request, the probe can require all caches to invalidate cache lines that are holding the requested memory word.

The probe filter 216 is an optional optimization that can prevent some probes from being generated and transmitted when no other components has cached the requested memory word. In many processing systems, transmitting probes to different components in the system can occupy a valuable bandwidth. Furthermore, in many cases, the requested address will not be cached in the cache of another component in the system. To prevent probes from being generated and transmitted when no other component in system 200 has cached a requested memory word, probe filter 216 maintains a list of all addresses of system memory 218 that are cached on other components of system 200. By comparing the requested memory word to this list, probe filter 216 can prevent probes from being generated and transmitted when no other component in the system is caching that memory word.

If the memory word requested by CPU 202 is located in visible coherent memory 238 of GPU local memory 234, after the request misses on cache 210, NB 211 sends a request to NB 225 of GPU 204. NB 225 then forwards the request to probe engine 228, which sends out probes (subject to probe filter 232). Similarly, if GPU 204 accesses either of coherent memory 242, NB 225 sends the request to NB 211 of CPU 202. NB 211 then sends the request to probe engine 214, which sends out probes (subject to probe filter 216). If a memory word requested by GPU 204 is located in visible coherent memory 238, probe engine 228 of GPU 204 sends probes (subject to probe filter 232).

When GPU 204 receives probes from CPU 202, the probes are processed by probe engine 228. In response to the probe, GPU 204 can write dirty cache lines back to system memory 218, and, if necessary, invalidate a cache line that is holding the requested memory word. Thus, in the embodiment of FIG. 2, cache 222 of GPU 204 is a coherent cache that implements a protocol for coherent sharing with other devices, e.g., the MESI protocol. In a further embodiment, probe engine 214 similarly processes probes received from GPU 204.

Cache 210 of CPU 202 is a physically tagged cache in which cache lines are tagged with physical addresses. In contrast, cache 222 of GPU 204 is a virtually tagged cache with cache lines tagged with virtual addresses. Before a probe is generated and transmitted from GPU 204, then, the requested address is translated into a physical address using address processing unit 224 so that probe engine 214 of CPU 202 can compare the requested address with the addresses held in cache 210 in order to process the received probe. On the other hand, when probe engine 214 of CPU 202 generates a probe, the requested address is a physical address. Upon receiving the probe, probe engine 228 of GPU 204 cannot immediately query cache 222 because cache 222 for the requested memory word is virtually tagged. Accordingly, GPU 204 also includes a reverse lookup table 230. Reverse lookup table 230 is used to map the received physical address to a virtual address. After mapping the received physical address to a virtual address, probe engine 228 of GPU 204 can process the probe, as described above.

As shown in FIG. 2, CPU 202 and GPU 204 each include a single execution engine coupled to a cache and an address processing unit. In alternate embodiments, CPU 202 and/or GPU 204 can be a multi processor system that includes more than one execution engine. In those embodiments, a cache and an address processing unit can be replicated for each additional execution engine. In a further embodiment, a respective probe engine and probe filter can also be replicated for each additional execution engine. For example, in GPU 204, for each additional execution engine 220 an additional cache 222, address processing unit 224, probe engine 228, and probe filter 232 can be provided.

Because coherent memory 242 of system memory 218 and visible coherent memory 238 of GPU local memory 234 are both coherent, these two memories can be indistinguishable from the standpoint of a programmer. In other words, from the standpoint of a programmer, coherent memory 242 of system memory 218 and visible coherent memory 238 of GPU local memory 234 essentially are different parts of the same memory, thereby greatly simplifying the programming model.

Figure 3:
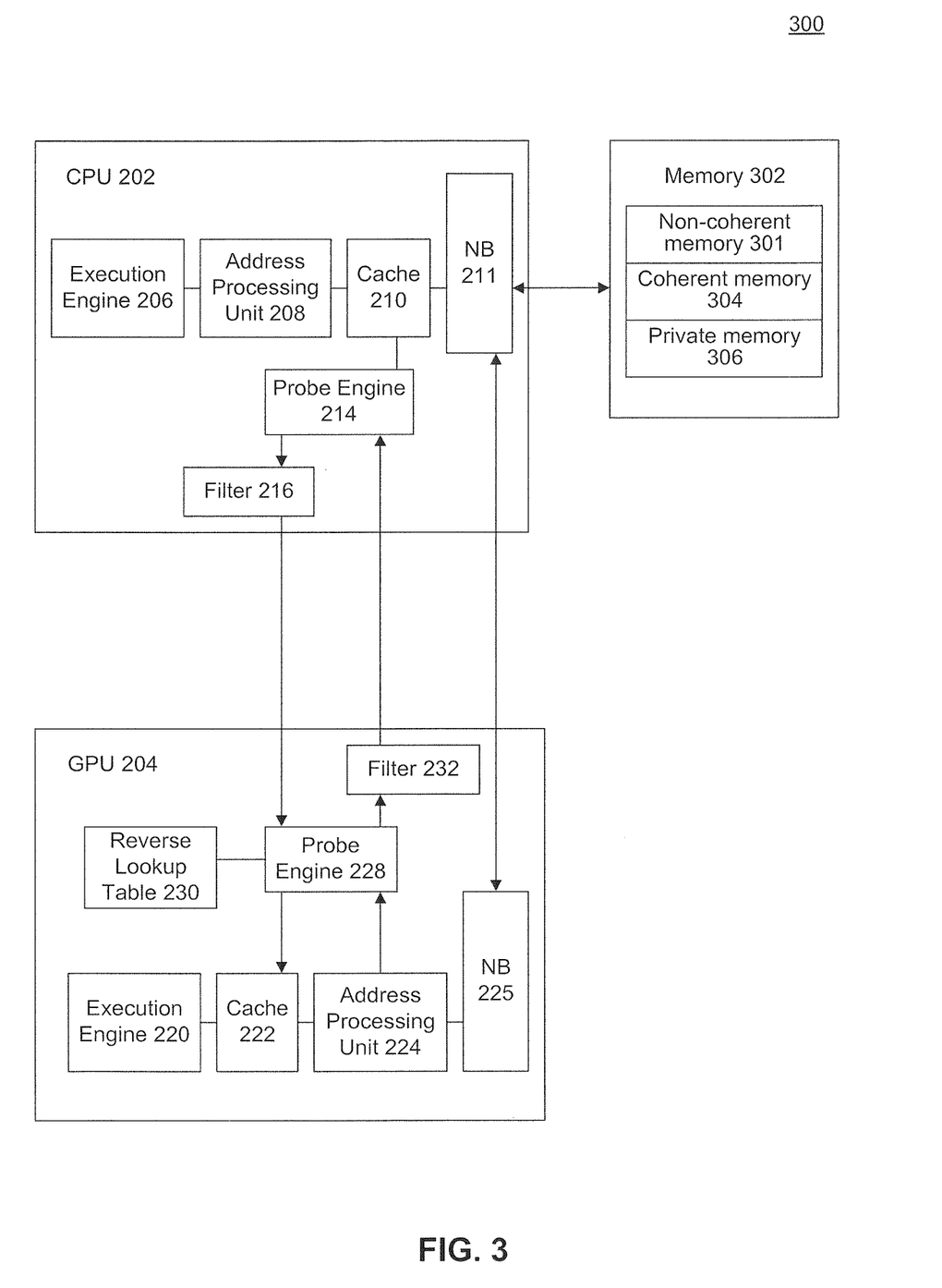

FIG. 3 shows a processing system 300, according to an embodiment of the present invention. System 300 is substantially similar to system 200 shown in FIG. 2, except that system memory 218 and GPU local memory 234 are replaced with a memory 302. For example, system memory 218 and GPU local memory 234, which may have been implemented on separate dies, can be implemented on the same die in memory 302. In another embodiment, all of system 300 can be included on a single die.

Memory 302 includes non-coherent memory 301, coherent memory 304, and a private memory 306. As shown in FIG. 3, GPU 204 must accesses NB 211 of CPU 202 to access memory 302. In alternate embodiments, NB 225 of GPU 202 may be able to directly access memory 302.

In an embodiment, accesses to private memory 306 are substantially similar to accesses to accesses of private memory 236, described with reference to FIG. 2. In the embodiment of system 300, coherent memory 240 and visible coherent memory 238 of system 200 are implemented in memory 302 as coherent memory 304. As described above, coherent memory 240 and visible coherent memory 238 can be indistinguishable from the standpoint of a programmer. Thus, in the embodiment in which system memory 218 and GPU local memory 234 are effectively combined into memory 302, coherent memory 240 and visible coherent memory 238 can be combined into coherent memory 304. Accesses from CPU 202 and GPU 204 to coherent memory 304 are substantially similar to accesses from CPU 202 and GPU 204 to coherent memory 242 and visible coherent memory 238. Similarly, in another embodiment, non-coherent memory 240 and visible non-coherent memory 239 can be combined to form non-coherent memory 301. Because memory accesses between CPU 202 and GPU 204 and the different coherent and non-coherent memories remain the same between systems 200 and 300, programs written for the processing system 200 can also be used on processing system 300, thereby obtaining the benefit of having multiple components formed on the same die without having to update the program.

Figure 4:
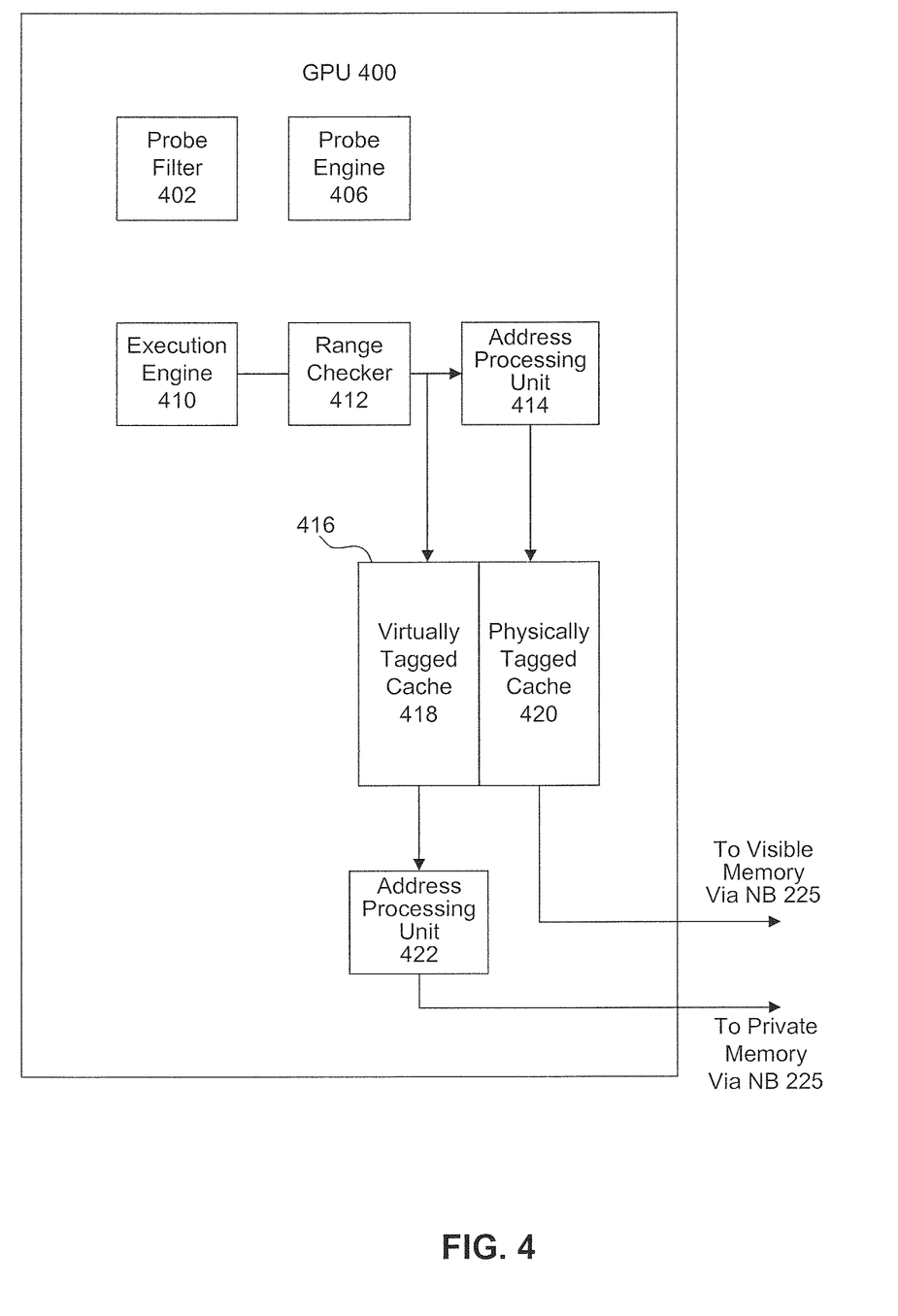
FIG. 4 is an illustration of a graphics processing unit, according to an embodiment of the present invention.

FIG. 4 shows a GPU 400, according to an embodiment of the present invention. In GPU 400 includes a probe filter 402, a probe engine 406, an execution engine 410, a range checker 412, a first address processing unit 414, a cache 416, and a second address processing unit 422. In an embodiment, probe filter 402, probe engine 406, and execution engine 410 are substantially similar to probe filter 232, probe engine 228, and execution engine 220, respectively, described referenced to FIGS. 2 and 3. GPU 400 is described with reference to the embodiment in which it is used in place of GPU 204 in systems 200 and 300. However, as would be appreciated those skilled in the relevant art(s), GPU 400 is not limited to that embodiment.

As shown in FIG. 4, cache 416 is a hybrid cache that includes a virtually tagged portion 418 and a physically tagged portion 420. In an embodiment, portion 420 caches memory addresses that may be accessed by a CPU or other component of the system. Portion 420 can cache memory addresses located in visible coherent memory 238 and portion 418 can cache memory addresses located in private memory 236 via a NB such as NB 225 (NB 225 is omitted in FIG. 4 for the purposes of simplicity). In this embodiment, then, a reverse lookup table is not needed because the only memory addresses that CPU 202 (or any other component in the system) can access, and thus the only memory addresses for which GPU 400 would receive probes are physically tagged.

When execution engine 410 generates a memory request, range checker 412 inspects the requested address to determine whether it is located in GPU coherent memory 238 or GPU private memory 236. If the requested address is within a range known to be located in GPU coherent memory 238, the requested address is immediately translated to a physical address using first address processing unit 414 and then portion 420 is queried to determine if it can service the request. On the other hand, if range checker 412 determines that the requested address is within a range known to be located in GPU private memory 236, portion 418 is queried to determine if it can service the memory request (without first translating the requested address). If the queried portion of cache 416 cannot service the request, i.e., on a cache miss, the operation of GPU 400 in servicing the memory request is substantially similar to the operation of GPU 204 in servicing a memory request on a cache miss.

Second address processing unit 422 is used to translate virtual addresses in portion 418 because GPU private memory 236 is physically tagged. In an embodiment, address processing unit 414 and address processing unit 422 are separate elements in GPU 400. In an alternate embodiment, address processing unit 414 and address processing unit 422 are the same address processing unit accessed at different points during the operation of GPU 400.

Figure 7:
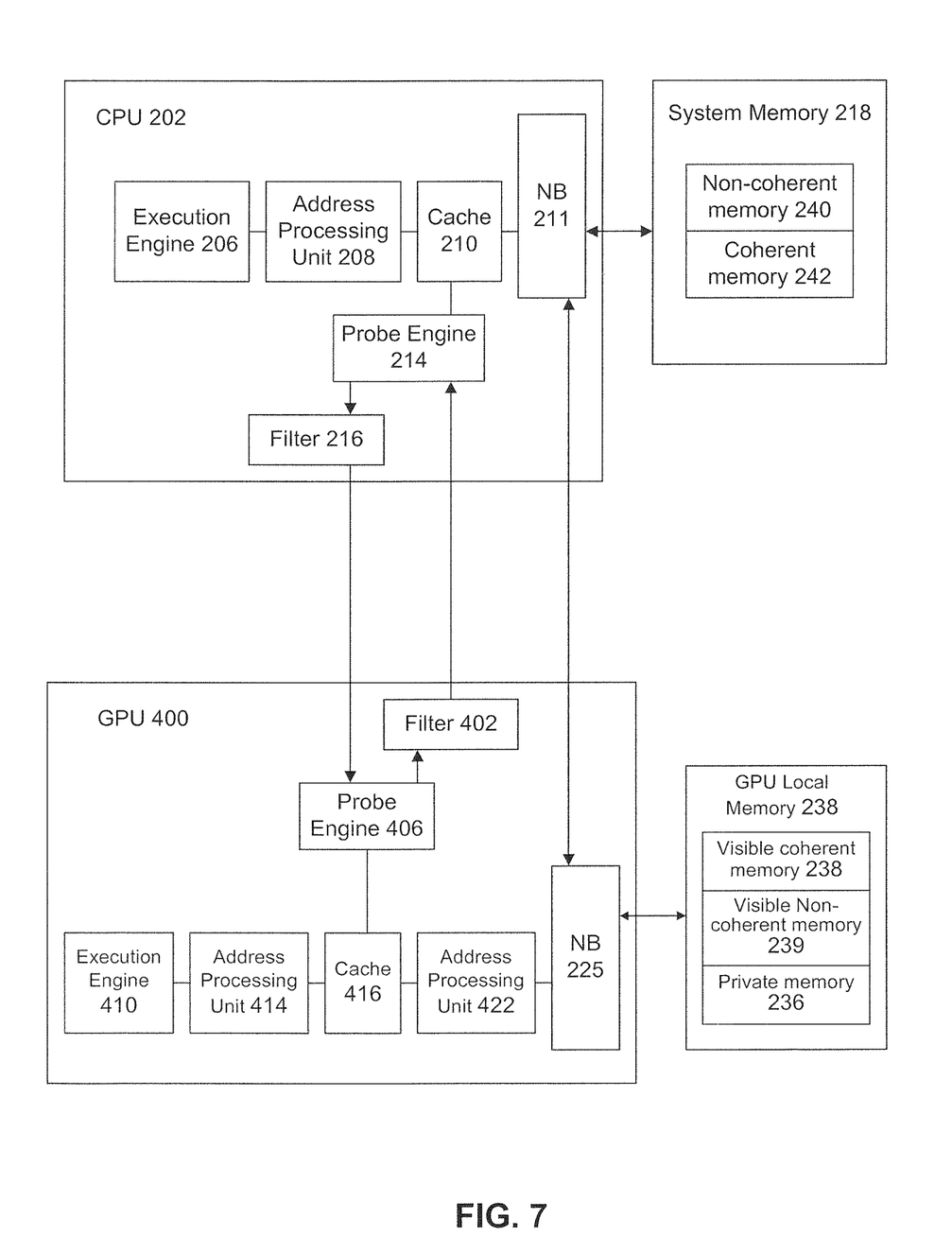
FIGS. 7-8 are illustrations of processing systems, according to embodiments of the present invention.
Figure 8:
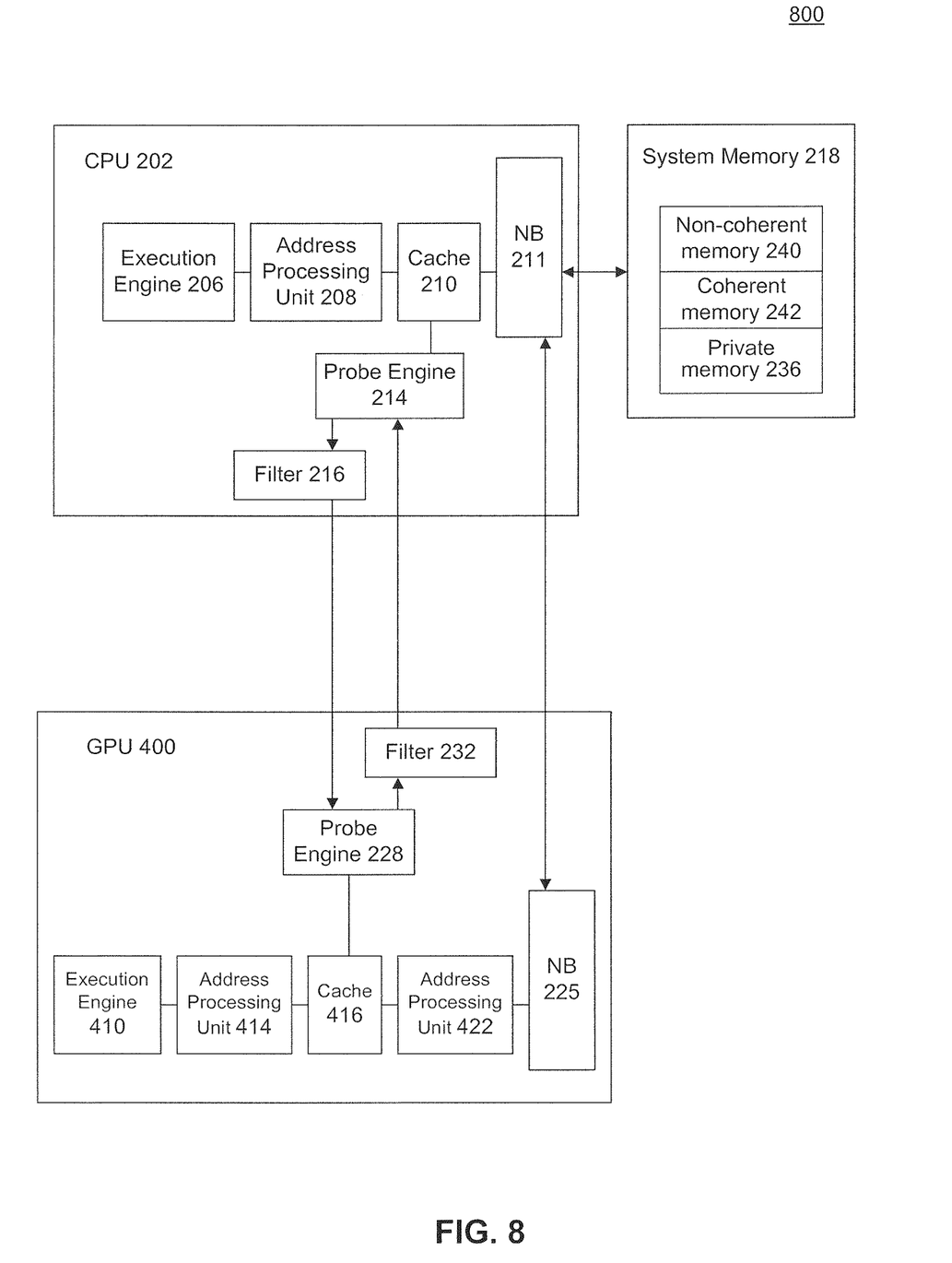

FIGS. 7 and 8 show processing systems 700 and 800, respectively, according to embodiments of the present invention. Processing systems 700 and 800 are substantially similar to processing systems 200 and 300, respectively, except that processing systems 700 and 800 include GPU 400, shown in FIG. 4, instead of GPU 200 (range checker 412 is omitted from FIGS. 7 and 8 for simplicity). As shown in FIGS. 7 and 8, the use of a hybrid cache can simply operations between the CPU and GPU. For example, as shown in FIGS. 7 and 8, GPU 400 does not include a reverse lookup table because all addresses that could be cached by cache 210 of CPU 202 are physically tagged in hybrid cache 416.

Each of FIGS. 2, 3, 7, and 8 conceptually show a connection between a CPU and a GPU for each signal being communicated between them. In an embodiment, the different signals transmitted between the CPU and the GPU can be multiplexed over the same set of one or more busses (or traces). In another embodiment, a different bus or trace can be used for each of the different signals.

Figure 5:
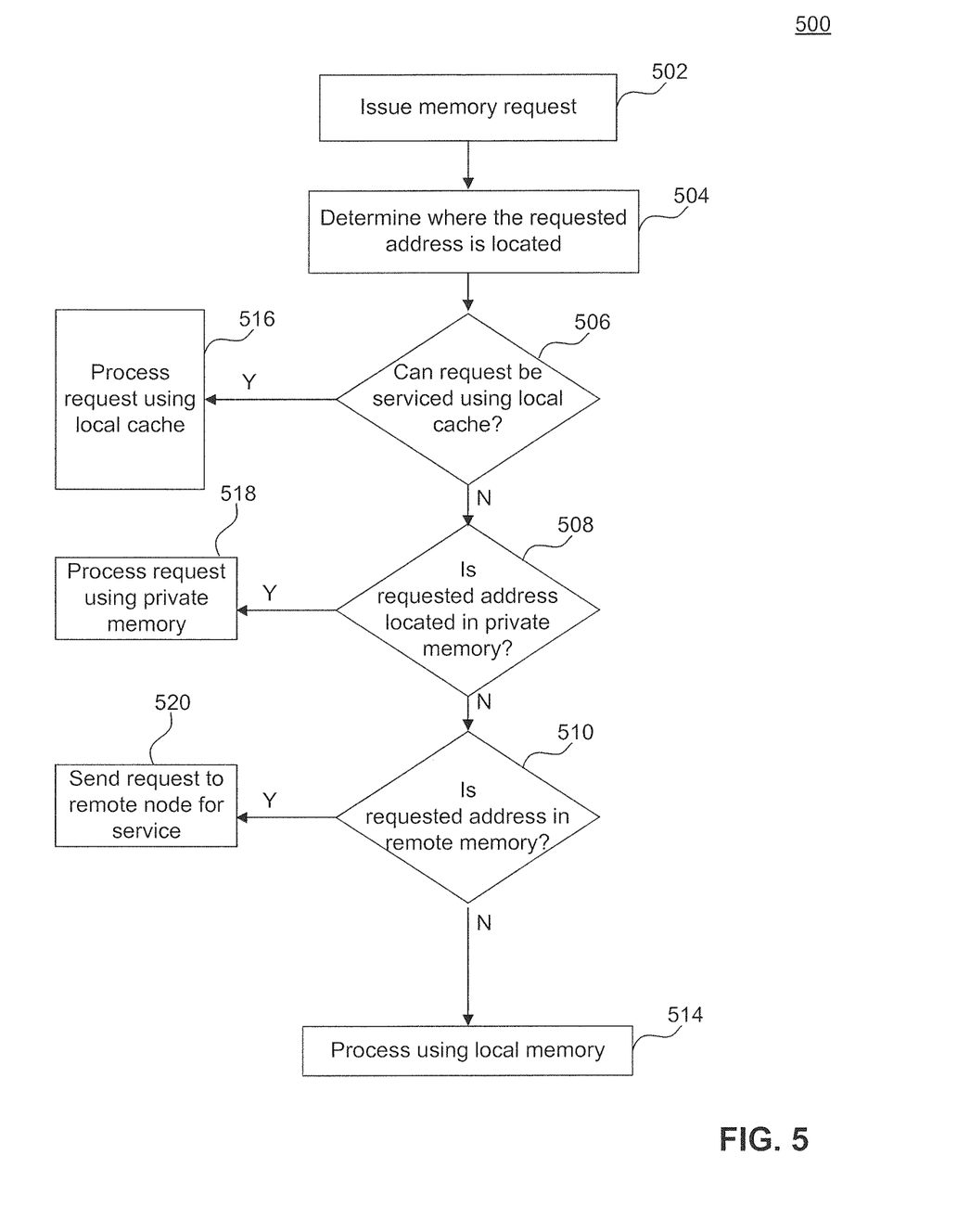
FIGS. 5-6 are flowcharts of exemplary methods of processing memory requests, according to embodiments of the present invention.

FIG. 5 is a flowchart of an exemplary method 500 of processing a memory request, according to an embodiment of the present invention. Other structural and operational embodiments will be apparent to persons skilled in the relevant art(s) based on the following discussion. The steps shown in FIG. 5 do not necessarily have to occur in the order shown. The steps of FIG. 5 are described in detail below.

In step 502, a memory request is issued. For example, in FIG. 2, execution engine 202 of CPU 202 or execution engine 220 of GPU 204 can issue a memory request.

In step 504, it is determined where the requested memory word is located. For example, in FIG. 2, address processing unit 208 or 224 determine where the requested memory word is located.

In step 506, it is determined whether a local cache can service the memory request. For example, the local cache can be queried to determine whether it is holding the request address and for the status of the cache line that is holding the requested memory word. For example, in FIG. 2, if address processing units 208 or 224 determines that the requested memory word is located in coherent memory 242 or visible coherent memory 238, respectively, caches 210 or 222, respectively, can be queried to determine whether they can service memory requests issued by execution engine 206 or execution engine 220, respectively. If the memory request hits on the local cache, method 500 proceeds to step 516. In step 516, the memory request is processed using the local cache.

If the memory request can not be serviced by the local cache method 500 advances to step 508. In step 508, it is determined whether the requested address is located in private memory. If so, method 500 proceeds to step 518. In step 518, the memory request is processed using the private memory. For example, in FIG. 2, if the requested address is located in private memory 236, NB 225 can access private memory 236 to service the request.

If the requested address is not located in a private memory, process 500 advances to step 510. In step 510, it is determined whether the requested address is located in a remote memory. If so, method 500 proceeds to step 520. In step 520, a request is sent to a remote node for service. For example, in FIG. 2, if the memory word requested by execution engine 220 of GPU 204 is located in system memory 218, NB 225 sends a request to CPU 202 for service. In an alternate embodiment, if the memory word requested by execution engine 206 of CPU 202 is located in GPU coherent memory 238, NB 211 sends a request for service to GPU 204.

In step 512, a local memory is used to process the memory request. For example, in FIG. 2, system memory 218 or GPU local memory 234 can be used to process a request from execution engine 202 of CPU 202 or execution engine 220 of GPU 204, respectively.

Figure 6:
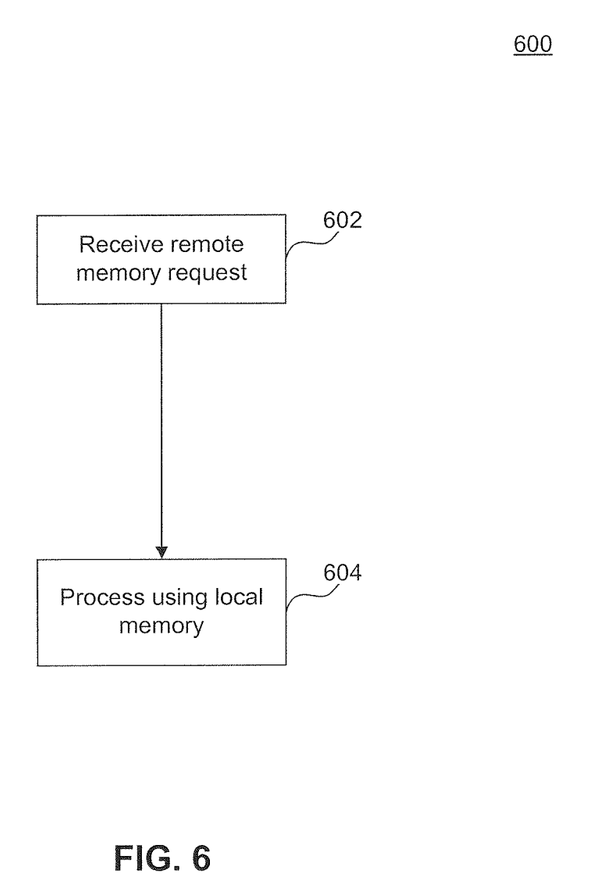

FIG. 6 is a flowchart of an exemplary method 600 of processing a memory request, according to an embodiment of the present invention. Other structural and operational embodiments will be apparent to persons skilled in the relevant art(s) based on the following discussion. The steps shown in FIG. 6 do not necessarily have to occur in the order shown. The steps of FIG. 6 are described in detail below.

In step 602, a remote request for service is received. For example, in FIGS. 2 and 3, NBs 211 and 225 can receive requests for service.

In step 604, the memory request is processed using a local memory. For example, in FIGS. 2 and 3, NBs 211 and 225 can access system memory 218 or GPU local memory 234 to access a request memory word.

As would be understood by those skilled in the art based on the description herein, some of the memory accesses described in methods 500 and 600 may require probes to be generated. For example, when a coherent memory is accessed, probes may need to be generated. In another embodiment, a probe filter can be used to determine whether to transmit the probes to other devices in the system. In yet another embodiment, the probe filter can be consulted before the probes are generated so that even on coherent memory accesses, probes may not need to be generated.

Embodiments of the present invention may be used in any computing device where register resources are to be managed among a plurality of concurrently executing processes. For example and without limitation, embodiments may include computers, game platforms, entertainment platforms, personal digital assistants, and video platforms. Embodiments of the present invention may be encoded in many programming languages including hardware description languages (HDL), assembly language, and C language. For example, an HDL, e.g., Verilog, can be used to synthesize, simulate, and manufacture a device that implements the aspects of one or more embodiments of the present invention. For example, Verilog can be used to model, design, verify, and/or implement the elements of systems 200, 300, 700, 800 and/or GPU 400, described with reference to FIGS. 2, 3, 7, 8, and 4, respectively.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A processing system, comprising:
a first processing unit configured to receive a request to access a memory word and to determine whether the requested memory word is stored in a local memory of the first processing unit; and
the first processing unit configured to store a list of all addresses of the local memory that are cached in a cache of the first processing unit, cached in a remote memory of a second processing unit, and cached in any other component of the processing system, and send a memory probe to the second processing unit to determine whether the remote memory of the second processing unit holds the requested memory word in a cache line with a value that is different from a value stored in the local memory of the first processing unit, wherein the memory probe is sent when there is a match for the requested memory word in the stored list of all addresses.

2. The processing system of claim 1, wherein the first processing unit is a graphics processing unit (GPU) and the second processing unit is a central processing unit (CPU).

3. The processing system of claim 1, wherein the second processing unit comprises an address processing unit, wherein an execution engine of the second processing unit is configured to generate a memory request, and wherein the address processing unit is configured to use a routing table to determine a location of the memory word associated with the memory request.

4. The processing system of claim 1, wherein the first processing unit comprises a probe engine and a probe filter, and wherein the probe engine is configured to transmit the memory probe in response to the probe filter indicating that the requested memory word is cached in another cache of the second processing unit.

5. The processing system of claim 1, wherein the cache of the first processing unit is virtually tagged and the second processing unit comprises another cache that is physically tagged, wherein the first processing unit further comprises a reverse lookup table configured to translate a received physical memory address to a virtual memory address.

6. The processing system of claim 2, wherein the cache of the first processing unit includes a first portion and a second portion, wherein the first portion of the cache is configured to cache memory words located in the local memory, and wherein the first portion is physically tagged.

7. The processing system of claim 6, wherein the second portion of the cache is virtually tagged.

8. A method of processing a memory request in a processing system, comprising:
receiving a request, by a first processing unit, to access a memory word;
determining whether the requested memory word is stored in a local memory of the first processing unit;
storing a list of all addresses of the local memory that are cached in a cache of the first processing unit, cached in a remote memory of a second processing unit, and cached in any other component of the processing system; and
when there is a match for the requested memory word in the stored list of all addresses, sending a memory probe to the second processing unit to determine whether the remote memory of the second processing unit holds the requested memory word in a cache line with a value that is different from a value stored in the local memory of the first processing unit.

9. The method of claim 8, wherein a probe filter maintains the list of all addresses of the first processing unit that are cached in the remote memory of the second processing unit and any other component of the processing, system.

10. The method of claim 8, further comprising:
determining that the cache of the first processing unit cannot service the memory request.

11. The method of claim 8, further comprising:
translating a memory address of the requested memory word included in the probe from a physical address to a virtual address.

12. A non-transitory computer readable medium carrying one or more sequences of one or more instructions for execution by one or more processors to perform a method for processing a memory request in a processing system, the instructions when executed by the one or more processors, cause the one or more processors to:
receive a request, by a first processing unit, to access a memory word;
determine whether the requested memory word is stored in a local memory of the first processing unit;
store a list of all addresses of the local memory that are cached in a cache of the first processing unit, cached in a remote memory of a second processing unit, and cached in any other component of the processing system; and
send a memory probe to the second processing unit to determine whether the remote memory of the second processing unit holds the requested memory word in a cache line with a value that is different from a value stored in the local memory of the first processing unit, wherein the memory probe is sent when there is a match for the requested memory word in the stored list of all addresses.

13. The computer readable medium of claim 12, wherein a probe filter maintains the list of all addresses of the first processing unit that are cached in the remote memory of the second processing unit and any other component of the processing system.

14. The computer readable medium of claim 12, the instructions when executed by the one or more processors further cause the one or more processors to:
determine that the cache of the first processing unit cannot service the memory request.

* * * * *